United States Patent [19]
Moore et al.

[11] Patent Number: 5,584,554
[45] Date of Patent: Dec. 17, 1996

[54] PROJECTOR SIGNAGE AND CONTROL SYSTEM

[75] Inventors: R. W. Moore, Toccoa, Ga.; Charles Pritchard, Etowah, Tenn.

[73] Assignee: E. C. I. Marketing, Inc., Decatur, Tenn.

[21] Appl. No.: 272,832

[22] Filed: Jul. 11, 1994

[51] Int. Cl.⁶ .................................................. G03B 21/00
[52] U.S. Cl. .................................................. 353/122
[58] Field of Search .............................. 353/52, 85, 103, 353/122, 28

[56] References Cited

U.S. PATENT DOCUMENTS

| | | |
|---|---|---|
| 1,798,078 | 3/1931 | Geyling et al. |
| 3,198,066 | 8/1965 | McGhee. |
| 3,552,845 | 1/1971 | Yates, Jr. ................... 353/74 |
| 4,150,887 | 4/1979 | Huber ......................... 353/52 |
| 4,432,618 | 2/1984 | Parker et al. .............. 353/103 |
| 4,933,690 | 6/1990 | Sangregory et al. ..... 353/103 |
| 5,136,397 | 8/1992 | Miyashita .................. 353/85 |
| 5,140,301 | 8/1992 | Watanabe ................... 340/332 |

OTHER PUBLICATIONS

Kodak Ektapro P–Com Protocol—The projector's communication language Copyright by Kodak AG 1992.
Kodak Ektapro Projector–Features "Using the Instruction Manual".

*Primary Examiner*—William Dowling
*Attorney, Agent, or Firm*—Pitts & Brittian, P.C.

[57] ABSTRACT

A projector signage and control system (10) for displaying a sequence of images onto a display screen (18). The projector signage and control system (10) is designed to monitor and control the operation of a projector (20). A projector control circuitry (14) is provided for enabling and disabling a projector (20) dependent upon levels of ambient light. In the event of a failure, a monitoring circuitry (16) seizes a telephone line (106), calls a predetermined number, and delivers a pre-recorded message such that appropriate actions may be taken. These events include the raising or lowering of the temperature within the projection system cabinet (26) to a temperature outside of a predetermined operating range, the sticking or other malfunction of the projector tray (24), the burning out of a bulb, a power outage, and the tampering of the projection system cabinet (26).

19 Claims, 8 Drawing Sheets

PROJECTOR SIGNAGE AND CONTROL SYSTEM

TECHNICAL FIELD

This invention relates to the field of billboards and other pictorial advertisement mediums used for displaying selected images to a viewing audience. More specifically, this invention relates to a system for continuously projecting a selected plurality of images in sequence onto a display screen and a control and monitoring system associated with the projection system.

BACKGROUND ART

In the field of advertising, it is well known that billboards are used to display one or more images to passersby. It is also well known that the cost of renting a billboard may be prohibitive for some would-be advertisers. Thus, the use of billboards is commonly becoming divided between several renters. For instance, the area defined by the billboard within which advertisements may be displayed may be subdivided into several regions, with each region being rented by a single advertiser. This practice is especially common with retailers in common shopping areas such as at outlet malls.

Another method of subdividing a billboard is to provide a plurality of vertically oriented multi-faceted units aligned such that a complete image is displayed by the combination of the displayed faces of each individual unit. In order to change the displayed image, each of the units is rotated. Thus, another face of each unit is displayed and, in combination with the other newly-displayed faces, the new image is displayed.

Each of these methods are limited in the number of advertisers which may utilize a single billboard. Specifically, the subdivided billboard wherein several advertisements are displayed simultaneously is limited by the size. Typically, no more than three or four advertisers may effectively use this billboard. In the second instance, the multi-faceted units typically define no more than three faces. Thus, only three display screens are possible. If one were to combine both of these embodiments, there would still be a maximum of approximately twelve advertisers.

Another method used to display a variety of images is to project an image onto a screen using a conventional projector such as a slide projector. The images may be changed by advancing the projector tray. In conventional home projector systems, up to 140 slides, and conceivably more, may be viewed in a single slide tray. Typical devices which have been developed to display advertisements or other signage using various types of projectors are disclosed in the following U.S. Patents:

| U.S. Pat. No. | Inventor(s)      | Issue Date    |
|---------------|------------------|---------------|
| 1,798,078     | R. Geyling, et al. | Mar 24, 1931 |
| 3,198,066     | C. L. McGhee     | Aug 3, 1965   |
| 3,552,845     | C. Yates, Jr.    | Jan 5, 1971   |
| 5,140,301     | Y. Watanabe      | Aug 18, 1992  |

Of these patents, the Watanabe ('301) device is designed to project a laser beam onto a doorway in the event of an emergency. The laser beam is provided for directing occupants out of a building in the event of an emergency. This type of signage is well known to be expensive to operate for extended periods of time. Further, the images displayed by a laser beam are insufficient as an independent image source to display an advertisement of a typical size and intricacy.

The Yates, Jr. ('845) device is a portable display device used for back-projecting an image toward a screen for viewing on an opposite side. The projector is enclosed within a housing closed at one end by the screen. The enclosure is provided with a temperature control to enable the projector when the inside temperature of the enclosure is within a pre-determined temperature range. A heater and a fan are both provided to maintain the operating temperature. A light sensitive element is provided to permit operation only in the darker hours of the day, as sunlight interferes with the projection of an image on the screen. However, this type of projector system cannot be economically used in conjunction with conventional billboard configurations. Specifically, the enclosure wherein is located the projector is expensive to manufacture and maintain considering the size required in relation to the size of the billboard. Further, considering the type of screen required to display the projected image, the screen can be used only for that purpose. Therefore, the screen is useless during daylight hours.

Those devices disclosed by Geyling, et al. ('078) and McGhee ('066) provide at least one projector for projecting images onto a display surface. The Geyling invention is specifically directed toward a projection surface which prevent undesirable ambient light from impinging upon the display surface. The Geyling device also allows wind to pass therethrough by dividing the screen into a plurality of swinging panels. Geyling, et al., do not disclose the operational characteristics and control of the projector.

McGhee provides a photo-electric switch to allow operation of the projector during the dark hours of the day with the images being projected on a blank screen. During the daylight hours, a painted image is displayed. A motorized device is provided for selecting the screen on which the image is to be displayed. In one embodiment, a scroll is provided on which is a blank panel and a painted panel, the motorized unit being used to scroll from one panel to the next at the onset of darkness or daylight. In another embodiment, the screen is composed of a plurality of laterally-disposed, vertically-oriented slats, one side of which is blank, the other side of which is painted. The motorized unit in the latter embodiment serves to rotate the slats 180° to display either of the blank or painted sides. McGhee does not teach the control of the projector unit with the exception of the amount of ambient light present.

None of the prior art disclosed teaches the use of on-site monitoring of operating conditions other than temperature and light. For example, none of the prior art provides for the monitoring of the operation of the projector lamp, the interchanging of slides within the slide carriage, or any other failures which may and will occur. Further, none of the prior art provides for the immediate contact of maintenance and/or police in the event of vandalism or some other situation which would require immediate attention. Further, the prior art is void in teaching the ability to control the operation of the projector from a remote location such as to alter the display sequence and duration of the various images.

Therefore, it is an object of this invention to provide a means for displaying a sequence of images onto a display surface such as a billboard while also providing means for monitoring the working environment of the projector.

It is also an object of the present invention to provide a means for alerting appropriate personnel as the occurrence of any selected event which interferes with the normal operation of the projector and control system.

Further, it is an object of the present invention to provide a means for controlling the functions of the projector from a remote location, those functions including, but not limited to, the display sequence and duration of the individual images.

DISCLOSURE OF THE INVENTION

Other objects and advantages will be accomplished by the present invention which serves to display a sequence of images onto a display screen such as a billboard. Moreover, the projector signage and control system of the present invention is designed to monitor and control the operation of a projector used in conjunction with the system. In the event of a failure, the system is designed to notify the proper personnel so that appropriate actions may be taken. A projection system is provided for projecting an image toward the image screen. A control system is provided for controlling each of the projection systems. Further, a monitoring system is provided for monitoring the integrity of each projection control system.

A projection system cabinet is provided for housing the projection system of the present invention. The cabinet is designed to contain at least one projector and at least one fan. An access door serves as the top panel of the cabinet and is provided with at least one hinge to assist entry. A lock is provided on another side of the access door to prevent unauthorized entry into the projector system cabinet. A window is provided in the front panel of the projection system cabinet for the projection of the selected images therethrough. The cabinet is provided with a plurality of openings for the venting of air, the openings being positioned so as to prevent precipitant moisture from entering. A timer associated with the projection control system is shown to be carried within the monitoring system cabinet for controlling the activation and deactivation of the projection system during hours of operation determined by the amount of ambient light.

The projector system is provided with a photocell for determining when the ambient light is low enough to project an image on the screen and when the ambient light has increased to a level preventing adequate display. Thus, the photocell works with the timer to enable operation of the projector.

The monitoring system of the present invention is enclosed within a monitoring system cabinet. Monitoring circuitry is carried within a control panel, with circuit breakers provided to reset the individual circuits. The monitoring circuitry includes a plurality of switches, each of which closes at the occurrence of a selected event. These events include, but are not limited to, the raising or lowering of the temperature within the projection system cabinet to a temperature outside of a predetermined operating range, the sticking or other malfunction of the projector tray, the burning out of a bulb, a power outage, and the tampering of the projection system cabinet. Indicator lights may be provided along with the monitoring circuitry such that when any of the switches are closed, personnel may quickly detect which event occurred to cause failure of at least a portion of the projection control system. The closure of the switch associated with a power failure also initiates the start-up of a backup power supply preferably associated with the monitoring circuitry only.

In the event that one of the switches is closed, a calling circuitry is activated to seize a telephone line and call a preselected phone number. A message generating and playback circuit is then activated to play back a selected message to the recipient of the call. The selected message is prerecorded using the same message generating and playback circuit. The recipient of the call and the message delivered is determined by the particular event that has occurred.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A projector signage and control system incorporating various features of the present invention is illustrated generally at 10 in the figures. The projector signage and control system, or system 10, is designed for displaying a sequence of images onto a display screen 18 such as a billboard. Moreover, in the preferred embodiment the system 10 is designed to monitor and control the operation of a projector 20 used in conjunction with the system 10. In the event of a failure, the system 10 is designed to notify the proper personnel so that appropriate actions may be taken.

Figure 1:
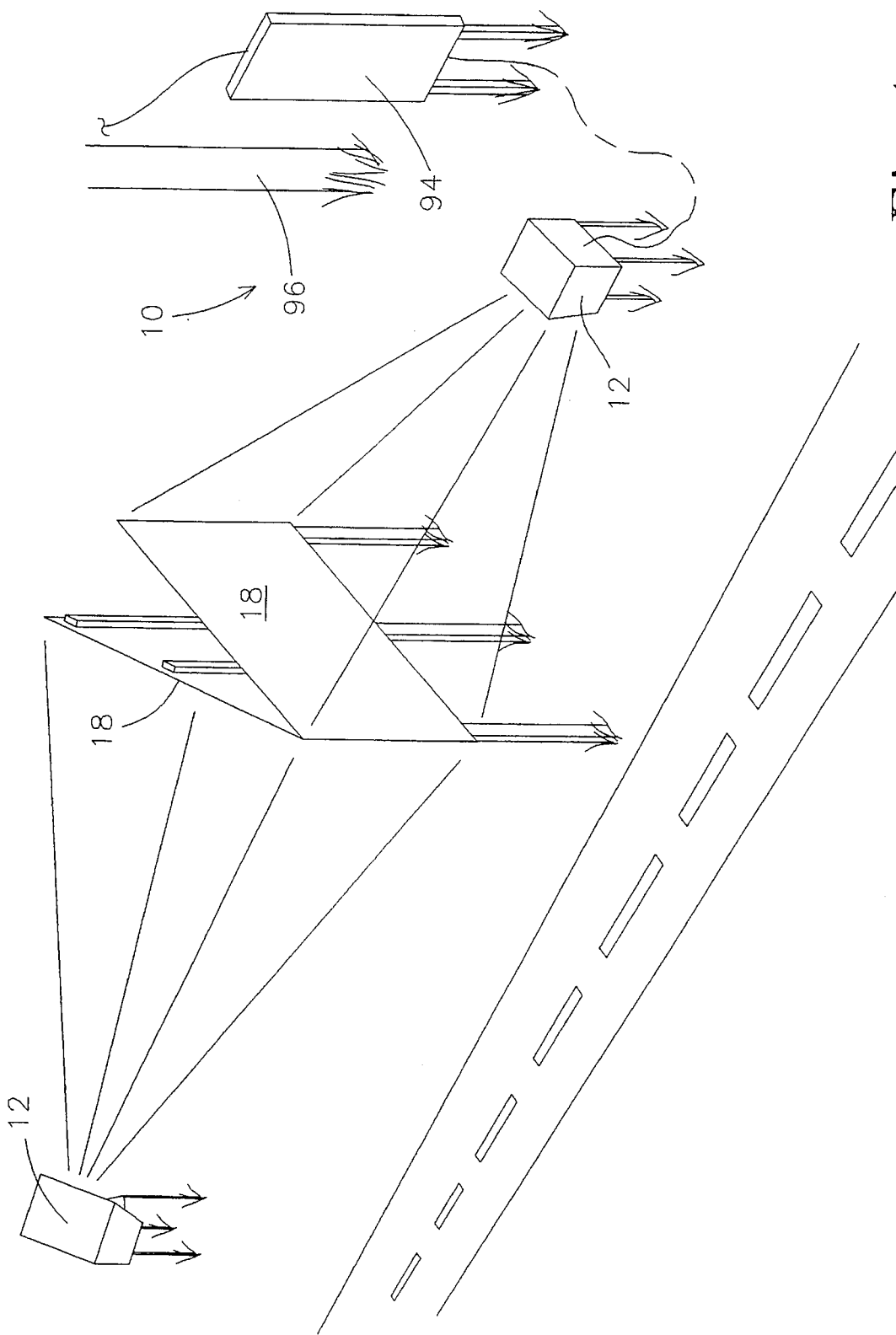
FIG. 1 is a perspective view of the projector signage and control system constructed in accordance with several features of the present invention showing two projector systems being used to project images onto two separate image screens.
Figure 7A:
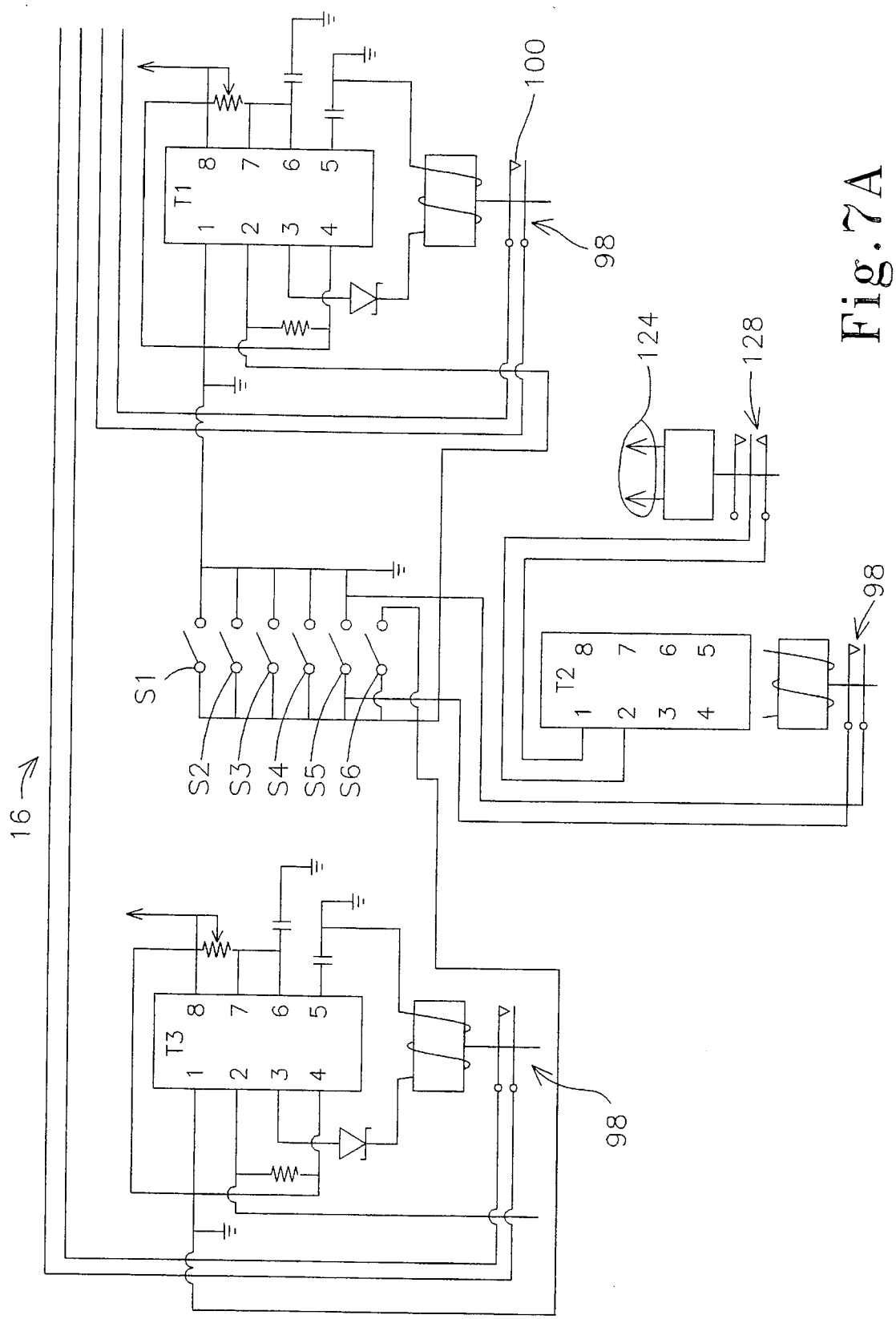
FIGS. 7A–C comprise a schematic diagram of the monitoring circuitry of the present invention.
Figure 7B:
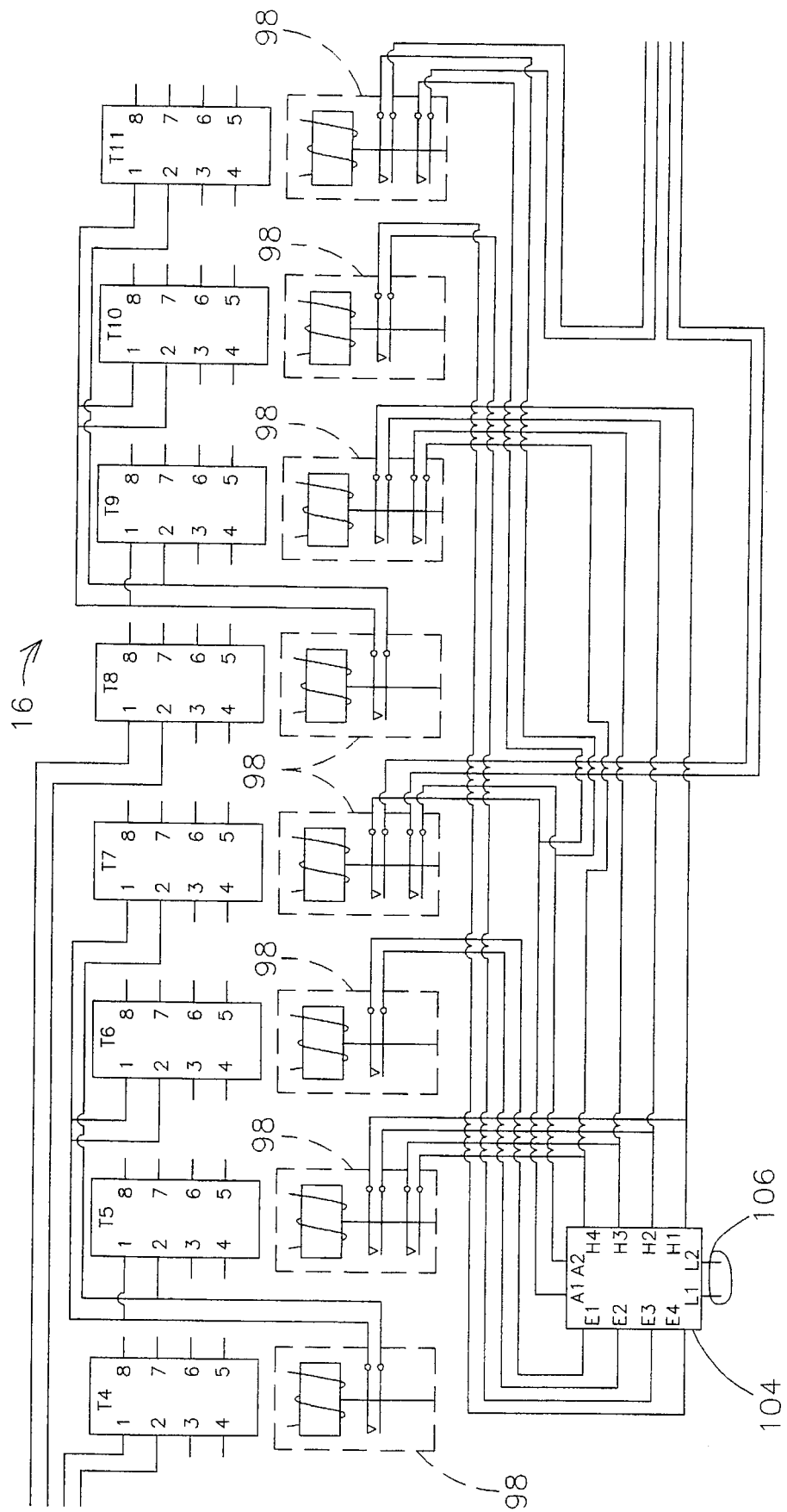
Figure 7C:
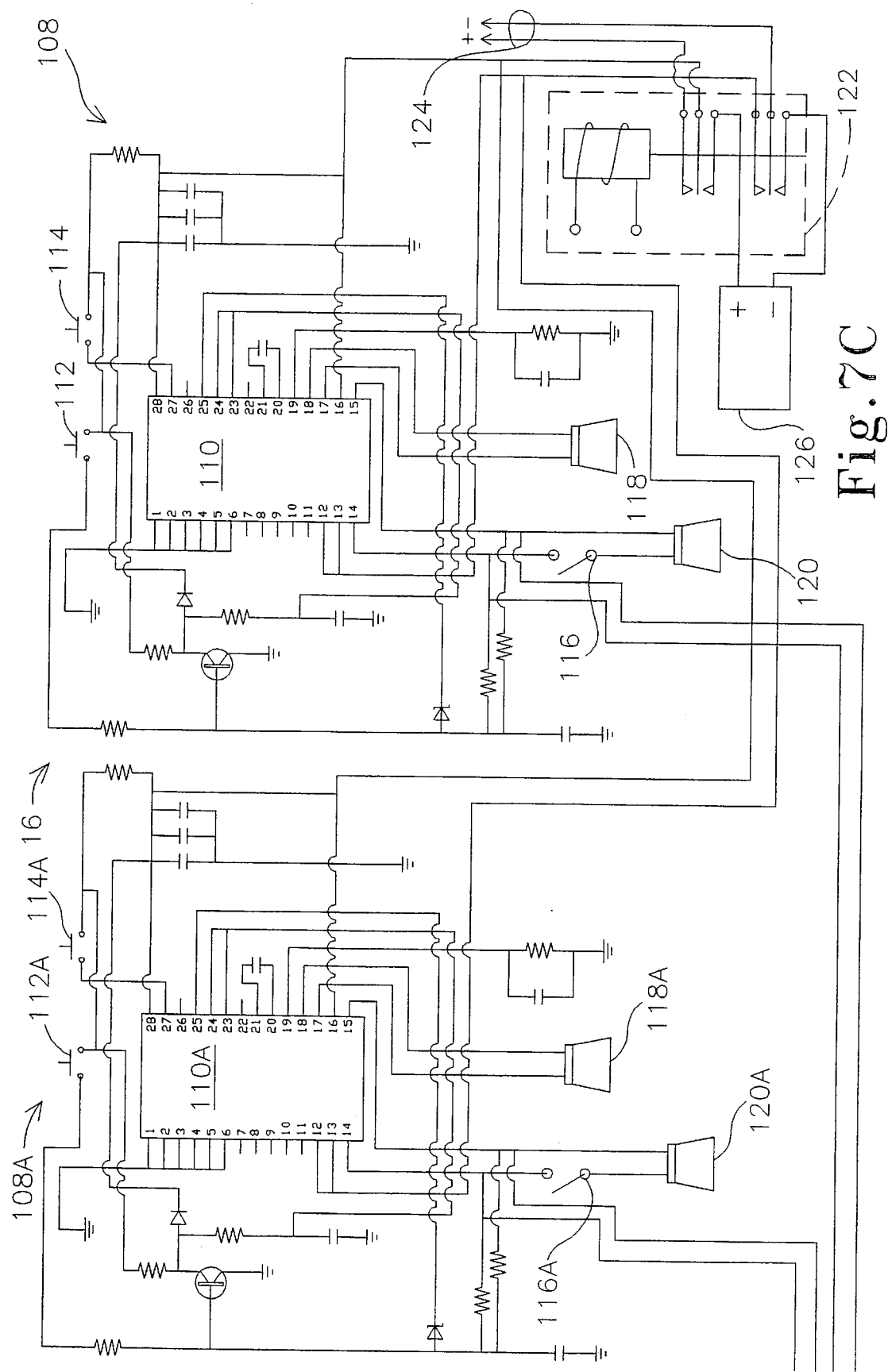

FIG. 1 generally depicts one adaptation of the system 10 of the present invention. Illustrated are two outdoor billboards 18 abutting at one end toward a roadway. A projection system 12 is provided for each billboard 18. A control system 14 is provided for controlling each of the projection systems 12. Further, a monitoring system 16, as illustrated in FIGS. 7A–7C, is provided for monitoring the integrity of each projection control system 12. Although each of the projection systems 12 is necessarily physically separated from the other according to the separation of the projection screens 18, the monitoring systems 16 associated with each may be concealed within a single unit as within the monitoring system cabinet 94. Power for the system 10 of the present invention is provided from a conventional power source at the power pole 96.

Figure 2:
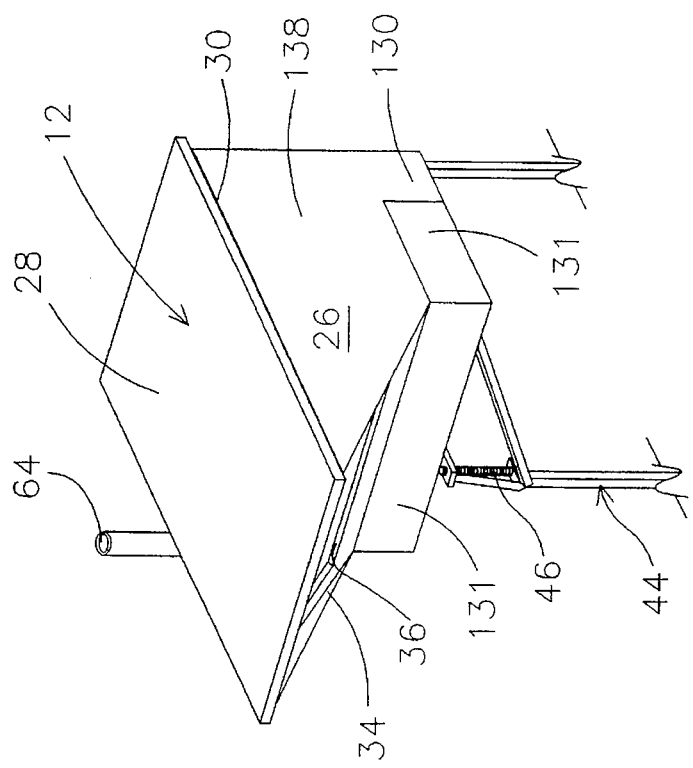
FIG. 2 is a perspective view of the projection system cabinet constructed according to several features of the present invention.

FIG. 2 illustrates one embodiment of a projection system cabinet 26 used in accordance with the present invention. The cabinet 26 is designed to contain at least one projector 20 and other associated equipment to be described in greater detail hereinafter. An access door 28 also serves as the top panel of the cabinet 26. The access door 28 is provided with at least one hinge 30 to assist entry. A lock 32 is provided on another side of the access door 28 to prevent unauthorized entry into the projector system cabinet 26. A window 36 is provided in the front panel 34 of the projection system cabinet 26 for the projection of the selected images therethrough.

The projection system cabinet 26 is mounted on a stand 44 such as the tripod shown. The tripod shown enables easy adjustment of the level of the projection system cabinet 26. Adjustment screws 46 are provided at the attachment of the cabinet 26 to each of the legs, thereby allowing the cabinet 26 to be moved vertically with respect to each individual tripod leg. It is conceivable that the projection system cabinet 26 may be mounted upon any conventional type of stand 44.

Figure 3:
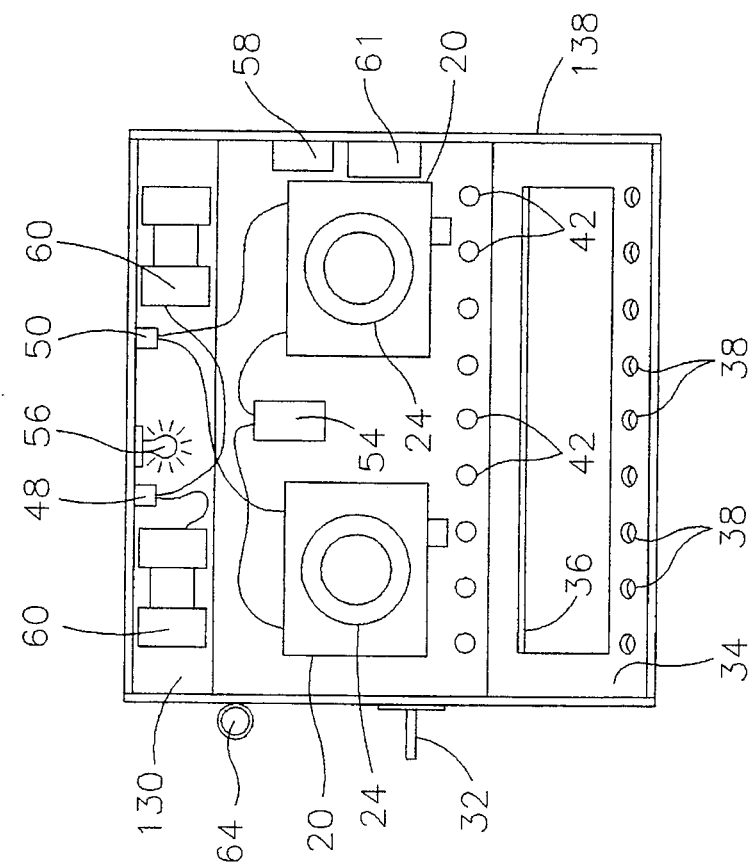
FIG. 3 is a top plan view of the projector system housing of FIG. 2 showing the top panel removed in order to illustrate a typical arrangement of equipment therein.

FIG. 3 more clearly illustrates the contents of the projector system cabinet 26. Two conventional slide projectors 20 are illustrated, with each being powered through the AC outlet 50. The slide projectors 20 may be used in alternating fashion through the use of a fader 54, or in any other conventional manner. One of the slide projectors 20 may be provided as a backup projector in the event of a failure of the first projector.

A plurality of fans 60 is housed within the cabinet 26 to limit the upper operating temperature range within the cabinet 26. A heater 61 is provided for limiting the lower operating temperature range within the cabinet. The fans 60 and heater 61 work in cooperation with the ventilation openings 38 in the top portion of the front wall 34 and the ventilation openings 42 in the bottom panel 40 to create an air flow through the cabinet 26. When the temperature sensor 58 provided within the cabinet 26 detects a temperature higher than a predetermined maximum operating temperature, the fans 60 are activated to force hot air out. The fans 60 are also used in cooperation with the ventilation openings 38,42 prior to the initiation of the projectors 20 to defrost or defog the projection window 36 when necessary. To this end, the fans 60 are activated at some selected time prior to the activation of the projectors 20. For example, this time period may be fifteen minutes, or any other time sufficient to achieve the desired results. This time period will obviously be dependent upon the particular environmental conditions. The fans 60 are powered from the AC outlet 48 carried within the cabinet 26.

Similarly, when the temperature sensor 58 provided within the cabinet 26 detects a temperature lower than a predetermined maximum operating temperature, the heater 61 is activated to force cold air out.

Also shown in FIG. 3 is a lamp 56 used to illuminate the interior of the cabinet 26 when necessary for inspection, modification, or repair of the equipment located therein. Secured to the exterior of the cabinet 26 is a receptacle 64 for mounting an umbrella (not shown) in the event that maintenance is required during rainfall. Thus, the components are protected from the rain.

Figure 4:
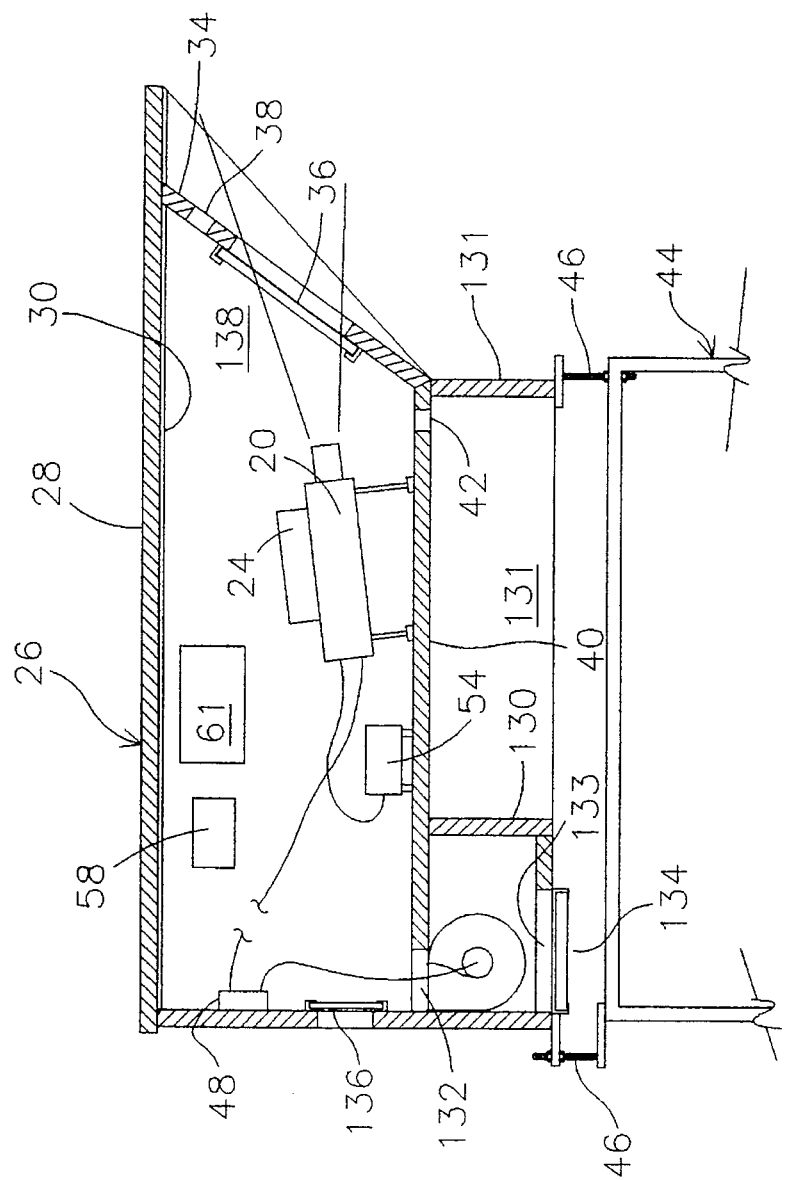
FIG. 4 illustrates a side elevational view, in section, of the projection system cabinet of FIG. 2 taken along 4—4 of FIG. 3.

FIG. 4 is a cross-sectional view of the projection system 12 and cabinet 26. In this figure, the front wall 34 is most clearly shown as being angled forward. This orientation provides enhances the integrity of the enclosure by preventing rain from entering through the projection window 36. The top panel 28 and side panels 138 are shown to extend beyond the top of the front panel 34 to further enhance this quality.

Further shown in FIG. 4 is the placement of the fans 60 within the cabinet 26. The fans 60 are placed below the bottom panel 40 and in a position to blow air through an opening 132. A fan housing 130 contains the fans 60 and is provided with an opening 133 for the entrance of air. An air filter 134 is provided for filtering the air introduced through the opening 133. A skirt 131 is secured around the bottom periphery of the cabinet 26 and abuts the fan housing 130. The skirt 131 extends below the cabinet 26 a distance substantially equal to the depth of the fan housing 130. The adjustment screw 46 associated with the front of the cabinet 26 is carried between the bottom of the skirt 131 and the stand 44 and is adjustable at the stand 44.

A viewing window 136 is provided in the back panel 140 for visually monitoring the equipment within the cabinet 26 without necessitating the opening of the top panel 28.

Figure 5:
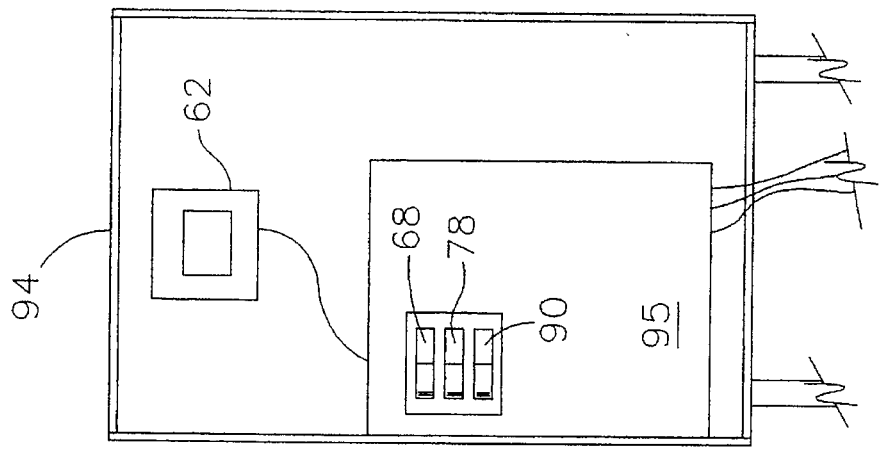
FIG. 5 illustrates a front elevational view of the monitoring system cabinet constructed in accordance with several features of the present invention.

FIG. 5 illustrates the general configuration of the monitoring system 16 of the present invention. The monitoring system cabinet 94 encloses the circuitry comprising the monitoring system 16. A timer 62 associated with the projection control system 14 is shown to be carried within the monitoring system cabinet 94 for controlling the activation and deactivation of the projection system 12 during hours of operation determined by the amount of ambient light. The operation of the timer 62 is to be described more fully below.

The control circuitry 14 is carried within a control panel 95, with circuit breakers 68,78,90 provided to reset the individual circuits 66,76,88. The specific circuitry is to be described in greater detail below. Illustrated is the circuitry associated with one projection system 12. However, as indicated previously, the control and monitoring circuitry 14,16 associated with more than one projection system 12 may be housed within a single monitoring system cabinet 94.

Figure 6:
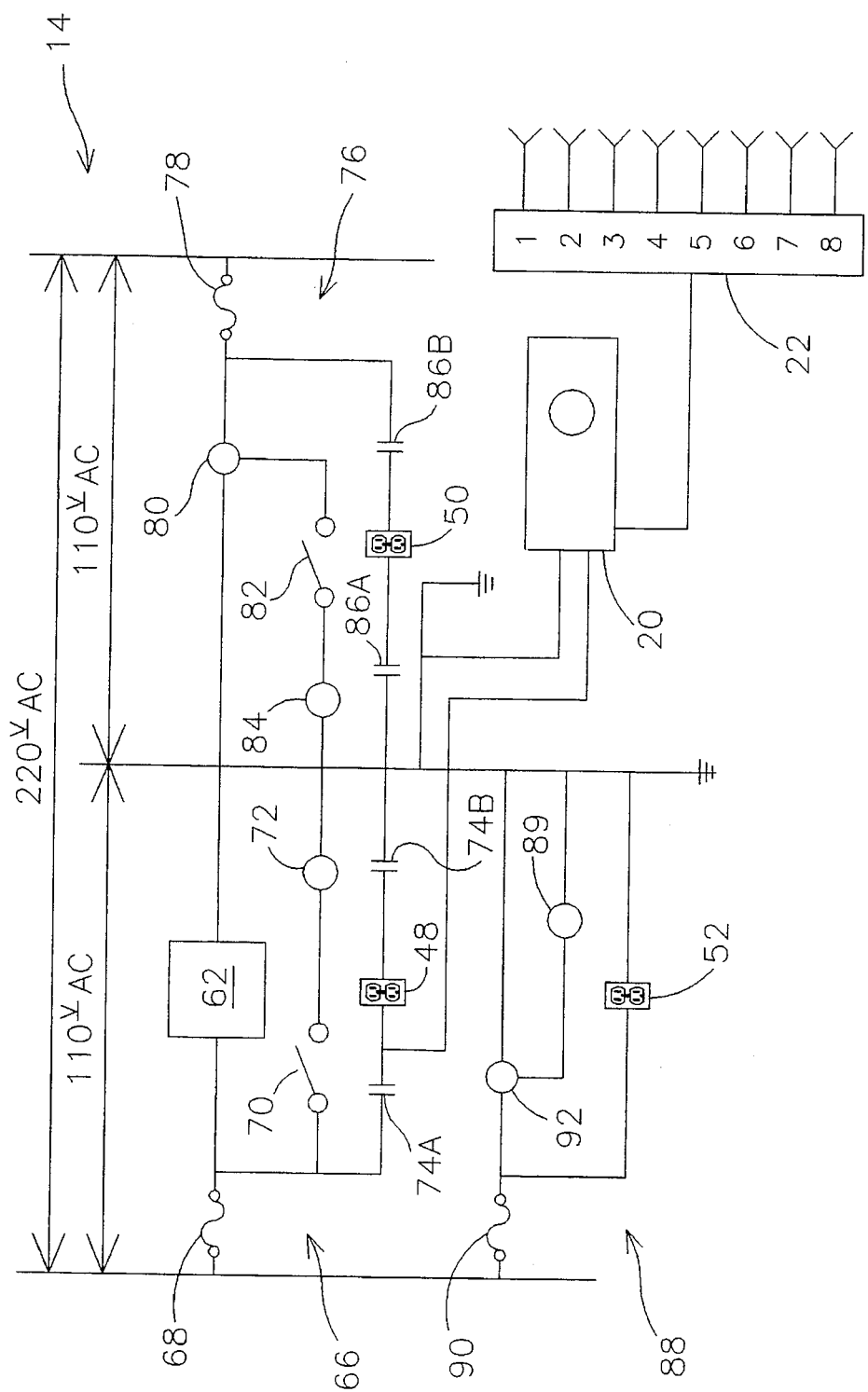
FIG. 6 is a schematic diagram of the projector control circuitry of the present invention.

The control circuitry 14 is schematically illustrated in FIG. 6. Three circuits 66,76,88 are shown which are powered from a line voltage of 230 V AC, typically. The line voltage is divided to provide a standard 115 V AC to each side of the circuitry 14. Shown on the left side of the circuitry 14 are the fan circuit 66 and the flag lamp and outside receptacle circuit 88. Each of the three circuits 66,76,88 is provided with a circuit breaker 68,78,90 and a receptacle 48,50,52, respectively. The receptacles 48,50,52 are provided for delivering power to the respective pieces of equipment.

The projector circuit 76 is provided with a photocell 80. The photocell 80 is used to determine when the ambient light low enough to project an image on the screen 18 and when the ambient light has increased to a level preventing adequate display. When the ambient light reaches a low enough level, such as at nightfall, the photocell 80 signals the timer 62. If the timer 62 determines that the instant time is within the operating hours of the projection system 12, then the timer switch 70 associated with the fan circuit 66 is closed. Closing the timer switch 70 causes energization of the coil 71, which in turn causes the contacts at 74A, B to close, thus energizing the fans 60 plugged in to the receptacle 48. During the later hours of the night and early hours of the morning, the cost of operating the projection system 12 may be too great when compared to the derived benefit to justify its operation. Therefore, it may be desirable to render the projection system 12 inoperable during those times. It may be desirable, for instance, to deactivate the projection system 12 between the hours of 11:00 PM and 5:00 AM. The timer 62 signals the system 12 at these respective times to deactivate or to activate. Of course, these times may vary depending upon the amount of traffic on the particular roadway and the types of advertisements to be displayed.

After a predetermined period, such as fifteen minutes, the timer switch 82 is closed. The coil 84 is then energized to close each pair of contacts at 86A, B. Power is then delivered to the outlet at 50, thus energizing the projector 20.

Independent from the timer 62 and the photocell 80 is the flag lamp and outside receptacle circuit 88. The flag lamp and outside receptacle circuit 88 is provided with a photocell 92 which operates in similar fashion to the photocell 80 previously described. However, in the flag lamp and outside receptacle circuit 88, the photocell 92 immediately energizes the flag lamp 89. Thus, when darkness falls, and until daylight comes, the flag lamp 89 will illuminate a flag, or some other display associated with the signage. Continuously powered, in darkness or in light, is a 110 V AC outlet 52. It will be seen that this outlet 52 may be used to provide electrical power for operations related to the maintenance of the projector, control and monitoring systems 12,14,16, or for any other use in the physical vicinity of either.

Shown in the schematic of FIG. 6 is a slide projector 20 such as the Kodak Ektapro 9000. In this particular projector 20, a P-Com programmer's language is used to control the functions thereof through a standard projector socket 22. This socket 22 allows for remote control. It will be understood that any other type of projector 20 may be incorporated from which an image is projected toward a viewing screen 18. For instance, it is envisioned that computer generated images projected in similar fashion to projection screen televisions may be incorporated. Therefore, it will be understood that the term "projector" is intended to be broader than merely a conventional slide projector. The term "projector" is intended to encompass any type of image projector.

A feature provided by the preferred projector 20 is the ability to control the operation thereof from a remote location. For example, a projector 20 may be provided with a plurality of slides to be projected onto the image screen 18. A catalog of the slides is kept such that the operator may program the order in which they are to be projected and the duration of projection of each one. Some of the slides may be provided for future display, with those slides not being projected until that time. When it is time for the slides to be added to the projection sequence, the projector 20 may be controlled via telephone lines 106 and programmed to insert the slide at a particular location within the sequence. Slides may be taken from the sequence in the same manner. Further, in the event that a projector 20 is used wherein the images are digitally stored, it is envisioned that images may be created at a remote location and transmitted to the projector over telephone lines 106 in similar fashion.

FIGS. 7A–C comprise a schematic diagram of the monitoring circuitry 16 of the present invention. Beginning with FIG. 7A, the monitoring circuitry 16 includes a plurality of switches S, each of which closes at the occurrence of a selected event. Shown are six such switches S1-6. In the preferred embodiment, switches S1,2 are operated in conjunction with the temperature sensor 58 within the projection system cabinet 26. Switch S1 is closed at a predetermined elevated temperature. Switch S2 is closed at a predetermined lowered temperature. Thus, if the temperature within the projection system cabinet 26 moves outside of a predetermined operating range, one of the switches S1,2 will be closed.

The switch S3 is closed by the projector 20 of the preferred embodiment when the projector tray 24 is stuck. Switch S4 is closed when the bulb burns out. The disclosed Kodak Ektapro 9000 is capable of detecting these problems. However, it will be understood that detection devices may be incorporated with projectors 20 not having this capability. The disclosed projector 20 is provided with two light bulbs so that in the event of one bulb burning out, the second bulb will automatically be rendered operable. Thus, downtime of the projector 20 is minimized. For this reason, although not shown, indicator lights may be provided along with the monitoring circuitry 16 such that when any of the switches S1-6 are closed, personnel may quickly detect which event occurred to cause failure of at least a portion of the projection control system 14. Specifically, if a bulb were to burn out and a reserve bulb rendered operable, personnel arriving at the site to correct any problems might not be able to quickly detect that a bulb has burned out since the projector system 12 will be operating normally.

Switch S5 of the preferred embodiment is provided for indicating a power failure. As will be discussed later, the closure of switch S5 also initiates the start-up of a backup power supply 126 preferably associated with the monitoring circuitry only 16. However, it is foreseeable to further associate the backup power supply 126 with the projection control circuit 14, or to provide an altogether separate backup power supply (not shown).

Switch S6 is associated with a motion detector (not shown) of a conventional type or some other type of detector for indicating an attempt of an intruder to enter the projection system cabinet 26. One skilled in the art may incorporate any conventional type of device to alarm of an intruder.

Other switches S may be incorporated wherein events other than those specifically described are to be monitored. For example, it is foreseeable that one might desire to monitor the humidity within the projection system cabinet 26, unauthorized entry into the monitoring system cabinet 26, or any other environmental conditions which may inhibit proper functioning of the projection system 12.

Figure 9:
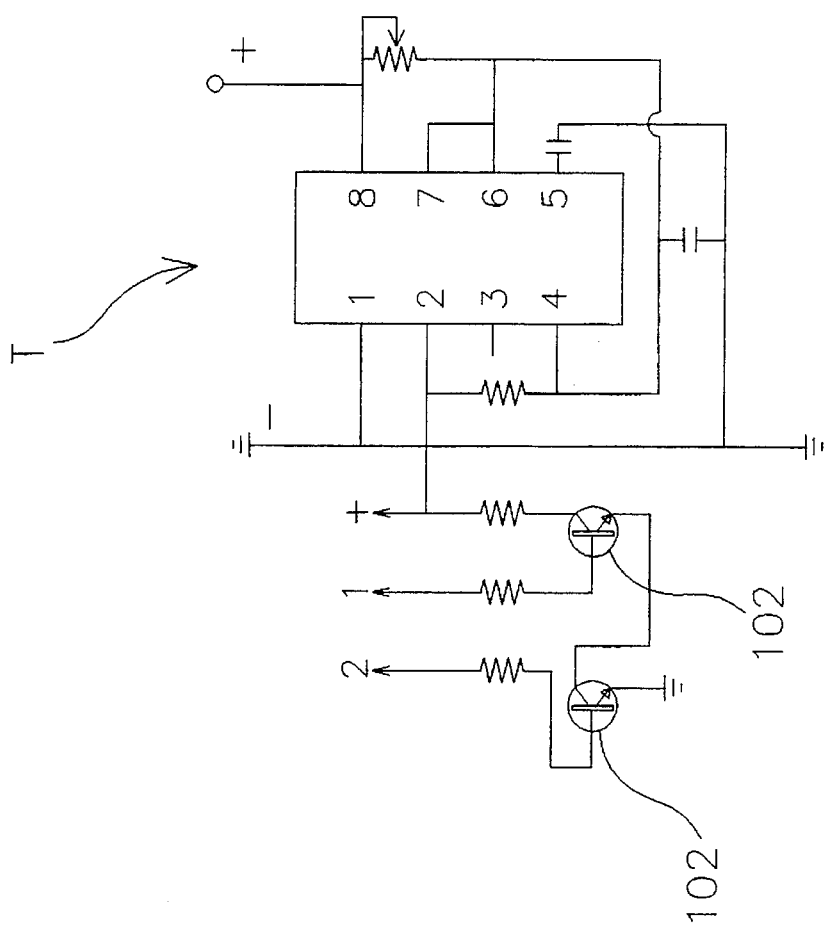
FIG. 9 is an alternate embodiment of the typical electrical circuitry of FIG. 8.

When one of the switches S1-5 is closed, a signal is delivered across pins 1 and 2 of the timer chip T1. Output from pins 3 and 5 of the timer chip T1 is delivered through a relay 98 to a timer chip T4, which serves to initiate a call and message playback sequence. The output from the timer chip T1, and from each other timer chip T2-11 to be described in greater detail below, is shown to be through a typical reed relay device 100. However, as depicted in FIG. 9, the relay 98 may be replaced with a high speed switching circuit. The reed relay 100 may be replaced with any other conventional relay as well. The timer chips T1-11 of the preferred embodiment are NEC555 integrated circuit (IC) chips. However, any other conventional IC chips may be used to perform the same or similar functions.

Output from the timer chip T4 is delivered through its associated relay to timer chips T5,6,7 simultaneously. The time required for output to the timer chips T5,6,7 may be varied as required. However, in the preferred embodiment, the timer chip T4 is activated for approximately one second. Timer chip T5 serves to seize the telephone line 106 associated with the projector monitoring system 16. The line 106 may be seized for any length of time as required. However, a time of approximately two minutes is preferable. Two minutes allows enough time for the recipient of the phone call to answer the phone and hear at least one complete iteration of the selected message to be broadcast. Timer chip T5 is connected via the relays to the telephone pad at pins H1,2,3,4. Each of these contacts are also used in cooperation with a battery supply to store memory. Pins H1,2 serve to charge the battery using the telephone line voltage when the phone line 106 is "on-hook". When the telephone line 106 is "off-hook", pins H3,4 are used.

The timer chip T6 serves to call a predetermined phone number in order to broadcast a selected message. The timer chip T6 is in communication with the telephone pad 104 at pins E1,E2. This operation typically requires no more than one second. However, the characteristics of the circuitry associated with the timer chip T6 may be altered to conform to any other required results. The timer chip T7 operates for approximately the same period of time as does the timer chip T5 and serves to continuously playback a selected prerecorded message. After the selected period of time elapses, two minutes for example, the phone line 106 will effectively be placed back on-hook. The timer chip T7 is in electrical communication with the telephone pad 104 at pins A1,2 and with the message generation and playback circuitry 108 in order to play back the selected message over the seized telephone line 106.

As described, if any of the first five switches S1-5 are closed, a selected person will be called and a selected message will be played to the recipient of that call. The person called may be maintenance personnel and the message may be on the order of "System malfunction, display booth located at XYZ location. Maintenance personnel required."

The message repeated over the seized phone line 106 is generated in the message generation and playback circuitry 108 schematically illustrated in FIG. 7C. The message is recorded onto and stored within the IC chip 110. The IC chip 110 of the preferred embodiment is an EEPROM 9328-064 which has the capability of digitally recording and storing a message of approximately 20 seconds.

A record switch 112 is provided such that when closed, a message spoken into the microphone 118 will be recorded on the IC chip 110. A playback switch 114 is provided such that when closed, the message recorded on the IC chip 110 will be continuously played back. A test speaker 120 is provided with a test switch 116 such that when the test switch 116 is closed and the playback switch 114 is closed, the recorded message will be played back through the test speaker 120. Thus, the personnel setting up or modifying the projection system 12 of the present invention may record any selected message no greater than the capacity of the IC chip 110 simply by depressing the record switch 112. After the message has been recorded, he may depress both the playback switch 114 and the test switch 116 to hear the message that was recorded. If the message is not satisfactory, the entire process may be re-initiated.

After the control system 14 has been initiated, the playback switch 114 may be continuously depressed. In another embodiment, however, it may be preferred to close the playback switch 114 simultaneously with the closing of one of the associated event failure switches S1-5, or at any other selected time in the sequence described, so long as the playback switch 114 is closed at least during the time in which a person at the receiving end of the call has the phone off-hook.

Also disclosed in FIG. 7C is an emergency power module 122 connected between the IC chip 110 at pins 12, 13, 16 and 28 and a line power supply 124. When power from the line power supply 124 is cut off, the relay switches 98 associated with the emergency power module 122 are reversed in order to activate the associated back-up power supply 126.

Returning to FIG. 7A, the closure of switch S5, at the event of a power failure, is caused by the close of the relay 98 associated with the timer chip T2. When the power failure occurs, power failure contacts 128 are closed, thus inputting a signal to the timer chip T2. This input causes the relays 98 associated with the timer chip T2 to close, thus closing switch S5. Thus, when a power failure occurs, as described above, the back-up power supply 126 is enabled to provide power for the electronics to operate so that when switch S5 is closed, the proper personnel may be contacted.

Upon the closing of switch S6 in the event of a potential intruder, a similar circuitry is provided for contacting another selected person. For example, it may be preferable to call the police in the event of one tampering with the projector system 12, as opposed to maintenance personnel. Thus, the message to be played back will vary depending upon the person called and the reason for the call.

When switch S6 is closed, a signal is delivered across pins 1 and 2 of the timer chip T3. Output from pins 3 and 5 of the timer chip T3 is delivered through a relay 98 to a timer chip T8, which serves to initiate a call and message playback sequence. The operation of the timer chips T3 and T8-11 is similar to that of timer chips T1 and T4-7, respectively. However, the individual circuits comprised by the respective sets of timer chips T are associated with an individual message generation and playback circuitry 108 as illustrated in FIG. 7C. Each individual message generation and playback circuit 108 is capable of playing back a single message. Thus, in the event that switch S6 is closed, the selected message may be "Need police assistance at display booth located at XYZ location. Vandals detected at site."

Timer chip T9 is connected via the relays to the telephone pad 104 at pins H1,2,3,4 in similar fashion as timer chip T5. Timer chip T9 serves to seize the telephone line 106 to call the appropriate personnel. The timer chip T10 serves to call a predetermined phone number in order to broadcast the selected message. The timer chip T10 is in communication with the telephone pad 104 at pins E3,E4. Timer chip T11 is in electrical communication with the telephone pad 104 at pins A1,2 and with the message generation and playback circuitry 108A in order to play back the selected message over the seized telephone line 106.

The message repeated over the seized phone line 106 is generated in the message generation and playback circuitry 108A schematically illustrated in FIG. 7C, which is identical to that previously described in association with the closure of event failure switches S1-5. Common elements in the circuit associated with the closure of event failure switch S6 are labelled with common numbers with an "A" suffix. The emergency power module disclosed previously is further connected to the IC chip 110A at pins 12, 13, 16 and 28.

It will be seen then, that for each selected message required, an individual circuit for accessing, generating and playing back that message is also required. It is foreseeable that for every event failure switch S provided, there may be a separate circuit provided to enable the playback of a message specifically directed toward that event failure.

It is also foreseeable to expand the individual circuitries to enable separate messages to be played to different recipients in the event of a single failure. For example, it is envisioned that upon the detection of an intruded tampering with the system 10, after the calling of the police, the system 16 may call an official with the owner of the projection system 10 to alert that person that tampering has been detected.

Figure 8:
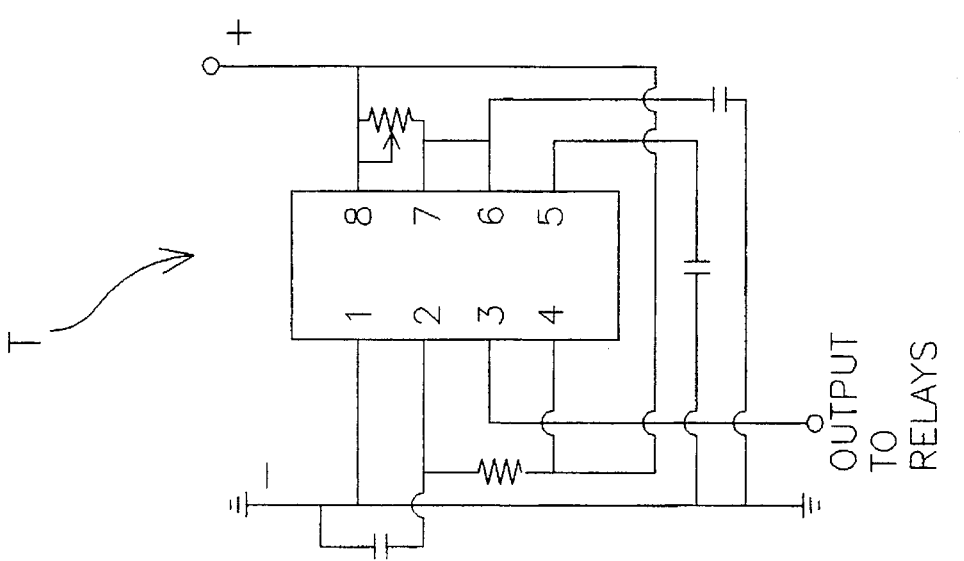
FIG. 8 is an enlarged schematic diagram of typical electrical circuitry associated with a timer chip incorporated in the monitoring circuitry of FIGS. 7A and 7B.

FIG. 8 illustrates with greater clarity the typical detail of the circuitry associated with the timer chips T1-11, generally noted therein as "T". Output to the relays 98 is from pin 3. As illustrated previously, this output may be to reed relays 100. However, FIG. 9 illustrates an alternate embodiment of the timer chips T wherein the reed relays 100 are replaced with transistors 102. Of course, the associated circuit is modified such that a similar result will be yielded with the use of either type of relay 100, 102. It will be understood by those skilled in the art that the relays 98 may be replaced with any other type of relay as well.

From the foregoing description, it will be recognized by those skilled in the art that a projector signage and control system offering advantages over the prior art has been provided. Specifically, the projector signage and control system provides a system for projecting a sequence of images onto a display screen. The system of the present invention includes a control system for controlling the operation of a selected projector and a monitoring system for monitoring the operation of the projector and notifying the proper personnel in the event of a failure. The types of failures that occur determine the personnel to be contacted and the message delivered to that person. The events monitored include at least the operating environment of the projector, any malfunctions of the projector, the loss of power, and the attempts of an intruder.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A system for controlling and monitoring an image projector, said system comprising:
   at least one projector for projecting a sequence of images onto a display screen;
   control circuitry for controlling operation of said at least one projector; and
   monitoring circuitry for monitoring environmental and operating conditions to determine occurrences of events which threaten said operation of said at least one projector, said monitoring circuitry including:
      a plurality of event detection switches for detecting any one of said occurrences of said events which threaten said operation of said at least one projector;
      at least one calling circuitry, each said at least one calling circuitry being in association with at least one of said plurality of event detection switches, each said at least one calling circuitry for seizing a telephone line for a selected duration and dialing a predetermined telephone number; and
      at least one message generation and playback circuitry, one each of said at least one message generation and playback circuitry being associated with one each of said at least one calling circuitry for playing back a prerecorded message over said telephone line during said selected duration.

2. The system of claim 1 wherein said at least one projector includes a connector for enabling remote control thereof through conventional means.

3. The system of claim 1 wherein said at least one projector includes an output device for outputting a signal in the event of a malfunction thereof.

4. The system of claim 3 wherein said at least one projector includes a slide tray for retaining a plurality of slides upon which said images are mounted, said output device outputting said signal when said slide tray malfunctions.

5. The system of claim 3 wherein said at least one projector includes an illumination source, said output device outputting said signal when said illumination source malfunctions.

6. The system of claim 1 wherein said at least one projector is housed within a first cabinet for protecting said at least one projector.

7. The system of claim 6 wherein said control circuitry includes at least a temperature sensor for detecting a temperature within said first cabinet, said system further including at least one fan in communication with said temperature sensor, said at least one fan being activated at least when said temperature sensor detects an elevated temperature greater than a predetermined maximum operating temperature.

8. The system of claim 1 wherein said control circuitry includes at least a light sensor for detecting ambient light, said control circuitry rendering said at least one projector inoperable when said light sensor detects ambient light at a level greater than a predetermined maximum operating ambient light level.

9. The system of claim 1 wherein said control circuitry includes at least a timer for preventing operation of said at least one projector during selected periods of time.

10. The system of claim 1 wherein said plurality of event detection switches includes at least a high temperature switch and a low temperature switch for being closed upon detection of a temperature in an operating environment of said at least one projector, said temperature being outside a predetermined operating temperature range.

11. The system of claim 1 wherein said plurality of event detection switches includes at least one projector malfunction switch for being closed upon detection of a malfunction associated with said at least one projector.

12. The system of claim 1 wherein said plurality of event detection switches includes at least a power failure switch for being closed upon detection of a power failure associated with operation of said at least one projector.

13. The system of claim 12 wherein said monitoring circuitry further comprises a backup power supply for supplying power to at least said monitoring circuit upon closure of said power failure switch.

14. The system of claim 1 wherein said plurality of event detection switches includes at least a tamper switch for being closed upon detection of an unauthorized attempt at entry into said system.

15. A system for controlling and monitoring an image projector, said system comprising:
   at least one projector for projecting a sequence of images onto a display screen, said at least one projector including a connector for enabling remote control thereof through conventional means, an output device for outputting a plurality of signals in the event of one of a plurality of malfunctions thereof, a slide tray for retaining a plurality of slides upon which said images are mounted, and an illumination source, said output device outputting one of said plurality of signals when said slide tray malfunctions, said output device outputting one of said plurality of signals when said illumination source malfunctions, said at least one projector being housed within a first cabinet for protecting at least said at least one projector;

control circuitry for controlling operation of said at least one projector, said control circuitry including at least a temperature sensor for detecting a temperature within said first cabinet, a light sensor for detecting ambient light, and a timer for preventing operation of said at least one projector during selected periods of time, said control circuitry rendering said at least one projector inoperable when said light sensor detects ambient light at a level greater than a predetermined maximum operating ambient light level;

at least one fan housed within said first cabinet and being activated at least when said temperature sensor detects an elevated temperature greater than a predetermined maximum operating temperature;

monitoring circuitry for monitoring environmental and operating conditions to determine occurrences of events which threaten said operation of said at least one projector, said monitoring circuitry including a plurality of event detection switches for detecting any one of said occurrences of said events which threaten said operation of said at least one projector, at least one calling circuitry, and at least one message generation and playback circuitry, each said at least one calling circuitry being in association with at least one of said plurality of event detection switches, each said at least one calling circuitry for seizing a telephone line for a selected duration and dialing a predetermined telephone number, one each of said at least one message generation and playback circuitry being associated with one each of said at least one calling circuitry for playing back a prerecorded message over said telephone line during said selected duration; and a backup power supply for supplying power to at least said monitoring circuit upon detection of a power failure.

16. The system of claim 15 wherein said plurality of event detection switches includes at least a high temperature switch and a low temperature switch for being closed upon detection of a temperature in an operating environment of said at least one projector, said temperature being outside a predetermined operating temperature range.

17. The system of claim 15 wherein said plurality of event detection switches includes at least one projector malfunction switch for being closed upon detection of a malfunction associated with said at least one projector.

18. The system of claim 15 wherein said plurality of event detection switches includes at least a power failure switch for being closed upon detection of a power failure associated with operation of said at least one projector.

19. The system of claim 15 wherein said plurality of event detection switches includes at least a tamper switch for being closed upon detection of an unauthorized attempt at entry into said system.

* * * * *